United States Patent [19]

Shanklin et al.

[11] 3,915,335

[45] Oct. 28, 1975

[54] LOCKING GAS CAP

[75] Inventors: Donald J. Shanklin, Granada Hills; George E. Robson, Torrance, both of Calif.

[73] Assignee: Orion Industries, Inc., Torrance, Calif.

[22] Filed: Sept. 13, 1974

[21] Appl. No.: 505,660

[52] U.S. Cl. .................. 220/303; 70/169; 137/493; 137/493.8; 137/540; 220/210
[51] Int. Cl.² ..................... B65D 55/14; B65D 51/16; F16K 17/26
[58] Field of Search..................... 220/203, 303, 210; 137/493.8, 493.6, 493, 540; 70/169, 173

[56] References Cited
UNITED STATES PATENTS

| | | | |
|---|---|---|---|
| 2,210,555 | 8/1940 | Podolsky | 137/493.8 |
| 2,880,903 | 4/1959 | Nehls | 70/169 |
| 3,289,442 | 12/1966 | Benger et al | 70/173 |
| 3,402,580 | 9/1968 | Speck | 70/169 |
| 3,548,870 | 12/1970 | Morton | 137/540 |

FOREIGN PATENTS OR APPLICATIONS

| | | | |
|---|---|---|---|
| 467,160 | 11/1951 | Italy | 137/493.8 |
| 1,134,303 | 8/1962 | Germany | 220/203 |

Primary Examiner—William I. Price
Assistant Examiner—Allan N. Shoap
Attorney, Agent, or Firm—Fulwider, Patton, Rieber, Lee & Utecht

[57] ABSTRACT

A pressure relieved locking gas cap including a lock housing telescopically received in a valve housing, the lock and valve housings respectively engaging in an interlocked manner across opposed surfaces of an annular cover. The annular cover includes an annular seat on the interior thereof which is cut away to form two diametrically opposed slots. The valve housing includes on the upper periphery thereof two opposed detents which are inserted through the slots from below to engage the upper surface of the annular seat while the lock housing includes bayonet latches on the periphery which engage in the slots in opposition to the detents. The valve housing further includes two spring valve bores into which two corresponding compressors extending from the lock housing are received, the compressors being opposed by valve springs in the bores which assist the opposing interlock across the cover.

7 Claims, 14 Drawing Figures

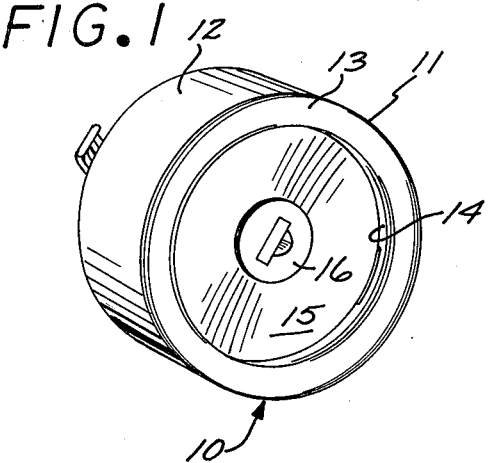
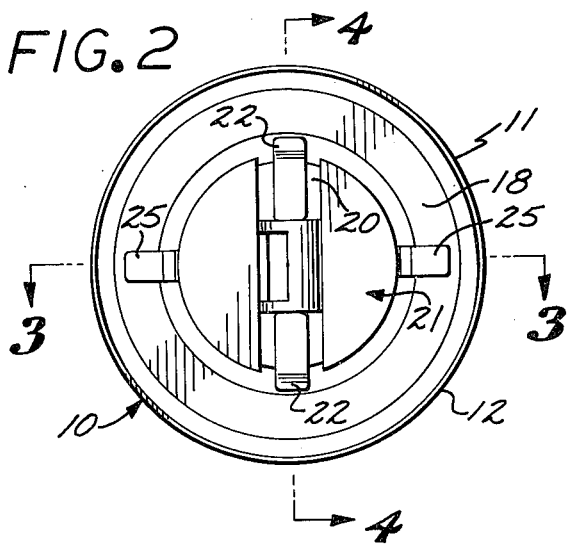
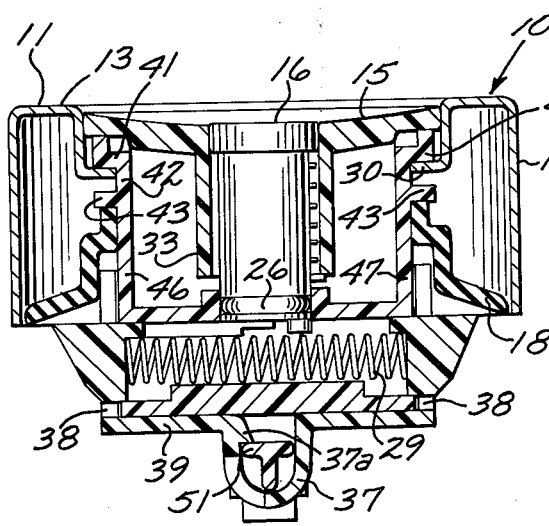
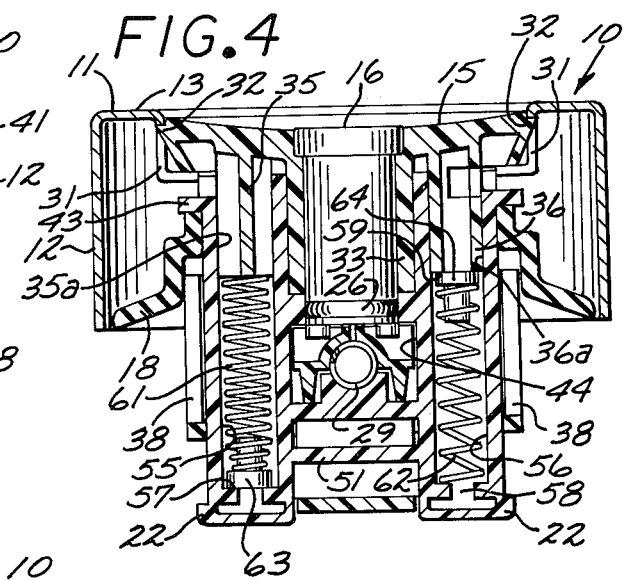
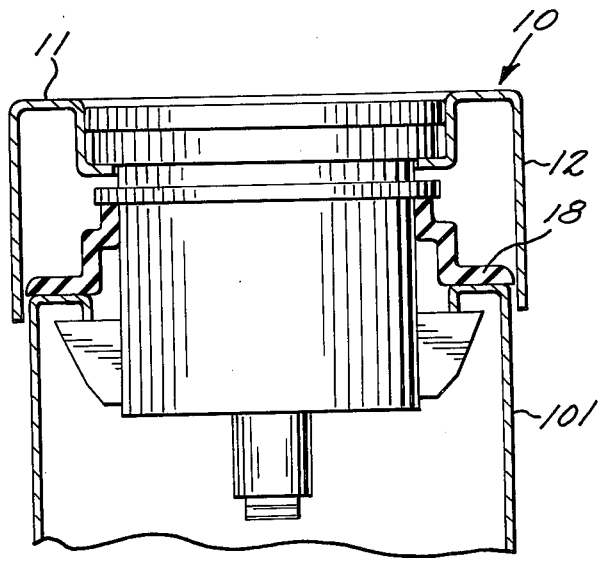
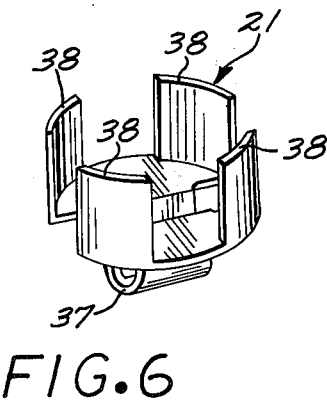

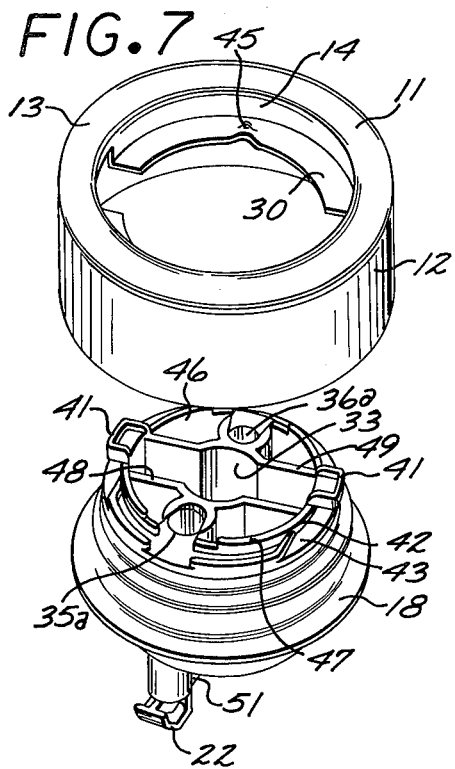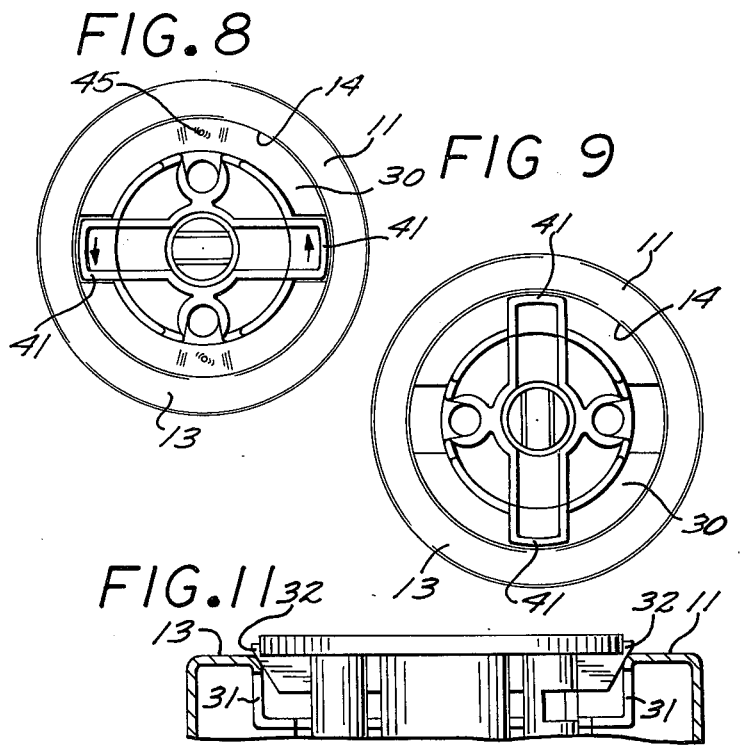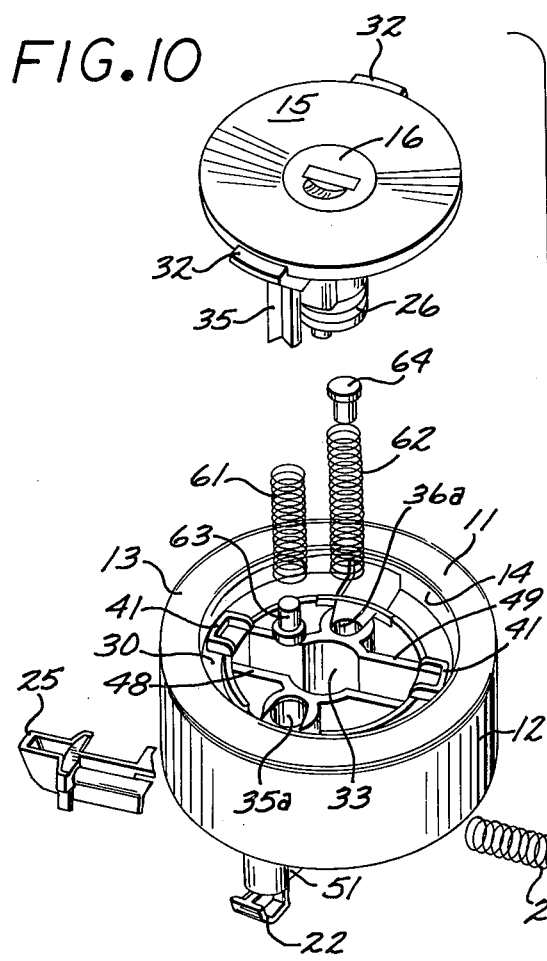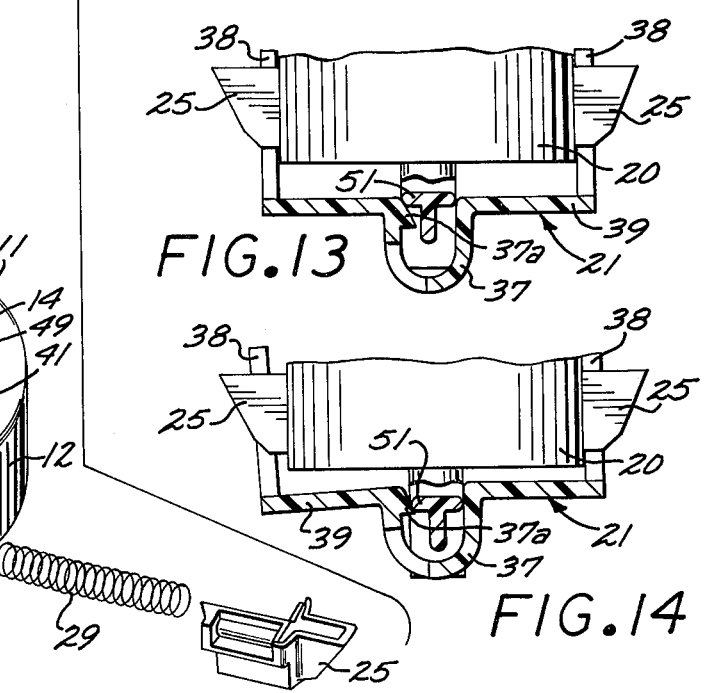

LOCKING GAS CAP

CROSS-REFERENCE TO RELATED APPLICATION

While the present invention is of general utility, it is particularly suitable for use with, and will be described in connection with, the apparatus of the type shown and described in U.S. Patent Application Ser. No. 251,340, to Donald J. Shanklin, filed May 8, 1972.

BACKGROUND OF THE INVENTION

1. Field of the Invention

The present invention relates to locking gas caps, and more particularly to pressure relieved gas caps which are assembled without the aid of fasteners.

2. Description of the Prior Art

The prior art is replete with various closure configurations, many of which provide the combined functions of pressure relief together with a locking arrangement. While such prior art devices are effective in their use, their manner of assembly is not particularly suited to cost-effective mass production, particularly if the closure device combines such functions of locking and pressure relief. When adapted for gas tank closure in a typical automobile, such gas caps are provided with a central locking cylinder with the pressure relief and vacuum relief valves positioned on either side thereof. This manner of arrangement does not permit for large valve surfaces, as are usual in applications such as radiator caps or closures, and any spring bias exerted on such small pressure relief valves is therefore necessarily of a low loading. Springs of low coefficient are typically difficult to produce with any accuracy and are furthermore sensitive to the amount of dimensional pre-stress or compression. Accordingly, most such prior art closure devices require relatively elaborate assembly techniques by which accurate spring pre-stress can be achieved in the valves.

SUMMARY OF THE INVENTION

Accordingly, it is the general purpose and object of the present invention to provide within a vented locking closure or gas cap assembly two telescopically received adaptors which are latched across opposite sides of a cover and which are assisted to such latched position by enclosed spring-loaded vent valves. Other objects of the invention are to provide a locking gas cap which is conveniently assembled without any fasteners. Yet further objects of the invention are to provide a locking gas cap which is assembled in the manner of bayonet-type fasteners.

Briefly, these and other objects are accomplished within the present invention by providing a stamped metal annular cover which includes on the interior periphery thereof a reduced diameter annular projection or shoulder, both the planar projection and part of the inner periphery of the cover being cut out at two diametrically opposed segments to form two diametrically opposed latching surfaces or slots.

The diametrically opposed openings or slots in the annular projection are sized to first receive two diametrically opposed detents formed on a necked-down upper annular section of a valve housing, the necked-down section of the housing being conformed to the interior diameter of the annular projection. After insertion, the valve housing is rotated to align the detents in orthogonal relationship relative the slots whereat they engage two projecting surface dimples formed in the annular projection. In this manner, the detents overlie the upper surface of the annular projection while the shoulder immediately below the necked-down section of the valve housing opposes the engagement of the detents at the dimples from below. The valve housing itself includes a central cylindrical cavity, concentric with the annular opening in the stamped metal cover, which is conformed to receive a central barrel of a lock housing projecting therein. The valve housing, furthermore, includes, along a diameter orthogonal to the detents, two valve bores within which pressure relief and vacuum relief valves and their corresponding springs are inserted. The lock housing is similarly formed to include two diametrically opposed latches extending distal of the periphery thereof and including, in the plane of the latches, two tubular spring compressors which are insertable into the corresponding valve bores in the valve housing. The two latches are formed on the exterior periphery of the lock housing and project to a dimension greater than the dimension of the inner periphery of the annular cover. It is contemplated that such be aligned in rotation by virtue of the alignment of the valve housing relative the surface dimples which controls the alignment of the spring compressors formed on the lock housing to align the latches with the gaps formed in the peripheral interior of the cover. The lock housing further includes, central therewith, a cylindrical lock which projects within a lock barrel towards the interior of the cover, the lock terminating thereat in two eccentric lugs. These lugs extend into a transverse cavity formed on the lower end of the valve housing to engage two opposed spring-loaded lock members received therein. The lock members each include a camming surface which engages the corresponding downwardly projecting eccentric lugs on the lock to be thereby withdrawn or extended by the turning of the lock. In this manner, a conveniently assembled locking vented gas cap is formed in which the initial alignment of the valve housing is maintained by the relative vertical dimensions of the detents and the surface dimples on the annular shoulder and which are furthermore assisted in engagement by the cooperating arrangement of the valve springs compressed therebetween.

BRIEF DESCRIPTION OF THE DRAWINGS

FIG. 1 is a perspective view of a vented locking gas cap constructed according to the present invention;

FIG. 2 is a bottom view of the gas cap shown in FIG. 1;

FIG. 3 is a side view, in cross section, taken along line 3—3 of FIG. 2;

FIG. 4 is a side view, in cross section, taken along line 4—4 of FIG. 3;

FIG. 5 is a side view, in cross section, of the inventive gas cap attached to a fill spout of a vehicle;

FIG. 6 is a perspective view of an adaptor suitable for use with the gas cap constructed according to the present invention;

FIG. 7 is a perspective view, by parts, showing the installation of the valve housing into the cover according to the present invention;

FIG. 8 is a top view illustrating the first position of the valve housing insertion;

FIG. 9 is again a top view showing the final position of the valve housing in the cover;

FIG. 10 is a perspective view, by parts, illustrating the installation of the valve and the lock housing into the cover arranged as shown in FIG. 9;

FIG. 11 is a side view, in partial cross section, illustrating the position of the lock housing prior to insertion;

FIG. 12 is a side view, in partial cross section, illustrating the lock housing after insertion;

FIG. 13 is a partial side view, in cross section, of the bottom end of the valve housing illustrating the position of the adaptor prior to engagement; and FIG. 14 is again a partial side view, in cross section, illustrating the position of the adaptor concurrent with engagement.

DESCRIPTION OF THE SPECIFIC EMBODIMENT

While specific reference is made in this description to a gas cap, such is made only for purposes of description and no intent to limit the scope of the invention is expressed hereby. It is intended that the present disclosure extend to any closure device, including similar features and assembled in a similar manner.

The locking, vented gas cap, shown in FIGS. 1 and 2 designated generally by the numeral 10, comprises a stamped metal annular cover 11 having a cylindrical exterior skirt 12 cut off at the bottom edge and convolved on the upper edge in a toroidal surface 13. The toroidal surface 13 convolves to the interior of skirt 12 to form an interior tubular surface 14. Received within the interior surface 14 is a circular lock housing 15 containing central thereto a cylindrical lock 16. The bottom edge of skirt 12, as shown in FIG. 2, is circular in section, surrounding on the interior thereof a circular seal 18. Circular seal 18 is similarly annular in planform, extending from the lateral surfaces of a cylindrical valve housing 20 which, below the seal 18 is partly surrounded by an adaptor 21. The free end of the valve housing 20 emerging from the bottom end of skirt 12, terminates in two transversely opposed secondary catches 22. A set of primary catches 25, aligned in a plane orthogonal to the plane of catches 22, projects from the lateral surfaces of the valve housing 20 below the seal 18 at a station above catches 22. As will be further described hereinbelow, the primary catches 25 are spring loaded in opposing relationship and are disposed to be withdrawn towards the interior of the valve housing 20 upon the turning of lock 16.

As shown in FIGS. 3 and 4, the lock housing 15 is again annular in section being conformed on the exterior periphery thereof to be received within the interior surface 14.

The interior surface 14 of the cover 11 furthermore extends downward into the interior of the skirt 12 to terminate at the lower end thereof in an inwardly turned annular shoulder or seat 30. Seat 30 and part of the interior surface 14 are cut away over two diametrically opposed segments to form receiving gaps or slots 31 into which two diametrically opposed bayonet latches 32, formed on the periphery of the lock housing 15, are receivable. Lock housing 15, furthermore, includes, projecting from the bottom surface thereof into the interior of cover 11, a tubular lock barrel 33, concentric with cover 11, conformed on the interior to receive the cylindrical lock assembly 16. Formed distal of the tubular lock barrel 33 and extending parallel therewith in a plane containing latches 32 are two tubular spring compressors, respectively 35 and 36. Spring compressors 35 and 36 are hollow on the interior, communicating laterally through openings 35a and 36a respectively to the exterior towards the gaps or slots 31.

At the bottom edge, the spring compressors 35 and 36 are similarly open, thus providing a gas passageway thereacross.

It is to be noted that the extreme distal projections of latches 32 are greater than the interior diameter of the interior surface 14 and therefore the radial edges of slots 31. Accordingly, in order to insert lock housing 15 into position, deformation of lock housing 15 is contemplated until the extreme projections of the latches are received within the slots 31. The lock housing 15 is thus positively secured against upward removal within the cover 11 in a manner similar to that of a bayonet receptacle. In order to permit such local deformation during the insertion stroke of lock housing 15, the upper surface thereof is formed along a concave conical surface to allow offset for local bending. The structure of lock housing 15 is therefore adapted for insertion from above into the interior of cover 11 and once received therein is retained from withdrawal in either direction by the engagement between latches 32 within the slots 31 and by the interference of the periphery of the housing 15 with seat 30.

As shown in FIGS. 3 and 7, the valve housing 20 includes, on the upper periphery thereof, two diametrically opposed detents 41. The detents 41 are conformed in planform to pass through the slots 31 from below, extending radially from the upper periphery of a necked-down cylindrical section 42 included in the valve housing 20. The radial dimensions of the necked-down section 42 is dimensionally conformed for receipt in the annular opening of seat 30, valve housing 20 expanding below the seat 30 to radial dimensions interfering with seat 30 at a shoulder 43. Following insertion of the detents 41 through slots 31, the body of the valve housing 20 is rotated by approximately 90° to align the detents 41 over two diametrically disposed surface dimples or deformations 45 formed in the surface of the seat 30. The deformations 45 increase the effective local thickness of seat 30 to a thickness just greater than the longitudinal dimension between the opposed surfaces of detents 41 and shoulder 43. In this manner, tactile alignment of the detents into proper position can be made from the inserting position shown in FIG. 8 to the final position shown in FIG. 9.

It is to be noted that the lock housing 15 is angularly retained relative cover 11 within slots 31. Accordingly, it is contemplated that the valve housing 20 be installed into position first, followed by the insertion of the lock housing 15 into the cover 11.

To achieve cooperating telescopic receipt, valve housing 20 includes two walls 46 and 47 disposed about the central axis thereof, formed in section to a segment of a circle, the circle being conformed to the exterior diameter of the lock barrel 33. Walls 46 and 47 are thus in longitudinal alignment with the central axis of valve housing 20, being laterally supported by connecting a central gap formed in two parallel webs 48 and 49 extending across the interior of the valve housing to join the lateral edges of detents 41.

Disposed within valve housing 20, in a plane normal to the planes of webs 48 and 49, are two valve bores, respectively 55 and 56, which are conformed in cross sectional dimension to telescopically receive the corresponding spring compressors 35 and 36 extending from the bottom surface of the lock housing 15. The alignment of the valve bores therefore dictates the relative angular position of lock housing 15 relative valve housing 20. Valve bores 55 and 56 project beyond the bottom surface of valve housing 20 into the interior of the structure of the secondary catches 22, valve bore 55 communicating across a valve seat 57 to the exterior of the corresponding catch 22, across lateral openings 57a formed in the lateral surfaces of the catch. Similarly, valve bore 56 communicates through an opening 58, again to the exterior of the other catch 22. Received within the valve bores 55 and 56 are two valve springs 61 and 62, valve spring 61 being opposed at the upper end by the bottom end of the spring compressor 35 and urging at the lower end a poppet valve 63 against the valve seat 57. In an opposed manner, valve spring 62, at the bottom end, engages a seat 59 formed about the opening 58 to urge at the upper end a poppet valve 64 against the bottom opening of the spring compressor 36. In this manner, two valve assemblies are formed in opposed bias, communicating across the inventive gas cap. Furthermore, valves 63 and 64 are biased in an opposed manner, valve 63 acting as a pressure relief valve to relieve any pressures built up within the gas tank, while valve 64 acts as a vacuum relief valve for relieving any vacuum in the gas tank.

As is typical in poppet valves, the unseating pressures are controlled by the spring compression and the size of the opening closed by the valve face. Since the spring compressor 35 does not act as a valve seat, no sealing fit of the bottom opening thereof is required. Accordingly, the opening 35a is formed in the manner of a longitudinal groove along compressor 35 which is molded in a butterfly section to provide a visual key for proper angular alignment of lock housing 15 relative the valve housing 20.

Referring back to FIGS. 3 and 4, the longitudinal dimension of the semicircular walls 46 and 47, and consequently the dimension of telescopic receipt of the lock barrel 33 within the opening surrounded by these walls, is controlled by a projecting bottom surface 23 of housing 20, surface 23 projecting to the interior of walls 46 and 47 to form a concentric opening 24 sized to receive the lower end of lock 16. The cylindrical lock 16 extends beyond the lower end of the lock barrel 33 to be received within the central opening 24, making a seal therewith by an 0-ring 26. At the lower surface, the cylindrical lock 16 includes two projecting lugs 27 and 28 which respectively engage corresponding camming surfaces in the catches 25. More specifically, catches 25 are received within a transverse cavity 44 formed in the valve housing 20 below opening 24 in the gap between the two valve bores 55 and 56 into which the lugs 27 and 28 project. Catches 25 are urged outwardly by a lock spring 29 interposed therebetween and are retracted inwardly in a conventional manner by the rotation of the cylindrical lock 16 within the lock housing 15 and the consequent engagement of lugs 27 and 28 against corresponding camming surfaces. Catches 25 are furthermore retained in extended position by the projecting lugs.

Thus, a manner of assembly is achieved by which the primary catches 25 are manually compressed to a withdrawn position concurrent with the insertion of the lock housing 15 within the interior of cover 11. This manner of assembly requires opposed forces on the two locking catches 25 to align the camming surfaces thereof for receipt of the lugs 27 and 28. Once in place, the lock 16 then retains the primary catches 25 in position within the cavity 44 to engage any flanges (not shown) in the tank filler tube.

As shown in FIG. 5, the exterior periphery of the valve housing 20 is conformed to the opening of a particular tank filler tube 101 wherein catches 25 engage an interiorly overhanging lip 102 formed on the free end of tube 101. In order to adapt to larger tank openings, a surrounding adaptor 21 is provided, which increases the exterior diameter of housing 20 in order to center the housing in a large filler tube 101 during insertion. Adaptor 21, as shown in FIG. 6, is generally arranged in the manner of a squirrel cage open on one side and comprising a plurality of circular segments 38 joined at one longitudinal end to a convolved circular base plate 39. Circular base plate 39 includes a channel convolution 37 arranged along a diameter thereof, convolution 37 dividing base plate 39 into two sections of a circle with the circular segments 38 projecting from the periphery thereof. Convolution 37 furthermore includes, on the interior thereof, a longitudinal catch 37a arranged to engage a transverse web 51 joining the two diametrically opposed valve bores 55 and 56. Since the longitudinal dimension of the gap between valve bores 55 and 56 is less than the exterior dimension of valve housing 20, the longitudinal dimension of the convolution 37 is therefore also reduced. This reduction in longitudinal dimension of the convolution 37, together with appropriate cutouts, provides a greater degree of flexibility therein, allowing for deformation during installation in a sequence shown in FIGS. 13 and 14.

It is furtermore contemplated that the lock housing 15, valve housing 20 and the adaptor 21 all be molded from a plastic material. This type of material structure allows for deformation as is necessary while installing housing 15 into cover 11, and the deformation of the adaptor 21 to engage the transverse web 51.

The manner of assembly of the foregoing inventive gas cap will now be set forth, with particular reference to FIGS. 8–14. As shown in FIG. 8, valve housing 20 is first inserted from below into the interior of cover 11, detents 41 being passed through slots 31 to overlie the upper surface of seat 30. From this position, housing 20 is rotated approximately 90° to align detents 41 over the surface dimples 45 to be thus frictionally engaged. This orientation is illustrated in FIG. 9. Once this orientation has been achieved, the two valve springs 61 and 62 and the corresponding poppet valves 63 and 64 are inserted into the valve bores 55 and 56 and are compressed therein by the insertion of the lock housing 15 into cover 11, as shown in FIGS. 11 and 12. Concurrent with the insertion of the lock housing 15, the primary catches 25 are compressed into the interior of cavity 44 to be engaged by the emerging lugs 27 and 28 on the lower surface of lock 16. Once in position, lock housing 15 is opposed against the upper edges of slots 31 by both the compressed springs within the valve bores and by the structural dimensions thereof. In this manner, the assembly is locked together across seat 30, the final engagement being made between the projecting latches 32 against the edges of slots 31.

Some of the many advantages of the present invention should now be readily apparent. The invention provides a convenient manner of assembly of a locking, vented gas cap which furthermore is self-biasing when assembled to maintain structural integrity. Furthermore, the invention allows utilization of conventionally molded plastic parts to provide an assembly which is relatively rigid and which comprises few individual parts.

Obviously, many modifications and variations of the present invention may be made with regard to the foregoing detailed description without departing from the spirit of the invention.

What is claimed is:

1. A pressure relieved locking closure comprising:
   an annular cover including an annular seat on the interior thereof;
   a lock housing receivable in said cover from a first direction, including latches for engaging said cover against withdrawal in a second direction;
   a valve housing receivable in said cover in said second direction including engagement means for engaging said seat; and
   spring biased pressure relief means disposed between said lock housing and said valve housing.

2. Apparatus according to claim 1 further comprising:
   lock means mounted in said lock housing; and
   spring-loaded catch means received in said valve housing and extending transversely therefrom, said catch means being adapted to engage said lock means to be withdrawn into the interior of said valve housing upon articulation of said lock means.

3. Apparatus according to claim 1 wherein:
   said lock housing is partly telescopically received within said valve housing.

4. Apparatus according to claim 3 wherein:
   said lock housing includes a central lock barrel, lock means received in said lock barrel, spring compressors extending distal of said barrel and parallel therewith, said spring compressors including central cavities communicating between the upper and lower ends of said lock housing; and
   said valve housing includes a central cavity for telescopically receiving said lock barrel, valve bores distal of said central cavity for receiving spring-loaded valves therein to be compressed by said spring compressors and spring-loaded latch means disposed transversely below said central cavity and adapted to be engaged by said lock means.

5. Apparatus according to claim 4 wherein:
   said cover includes diametrically opposed slots formed on the interior periphery thereof;
   said valve housing includes projecting detents on the upper periphery thereof formed for insertion into said slots from said second direction to extend over said seat; and
   said latches are formed on the periphery of said lock housing for engaging said slots.

6. A rapidly assemblable locking fuel cap for installation on a fuel tank filler neck comprising:
   an annular cover including an annular seat on the interior thereof;
   an elongated valve housing receivable in said cover from a second direction, having top and bottom ends and formed with axially extending vent and vacuum relief bores which are open on their respective one ends, said bores being formed in their extremities opposite said one ends with an annular vent valve seat and a relief spring stop, respectively;
   a lock housing receivable in said cover from a first direction telescopically receivable in said valve housing and formed with a spring compressor projecting into said vent bore and a tubular vacuum relief seat projecting telescopically into said vacuum relief bore;
   vent and vacuum relief poppets received in said bores for seating against said respective vent and vacuum relief seats;
   coiled vent and vacuum relief springs received in said respective vent and vacuum relief bores and interposed between said respective poppets and spring stops;
   a pair of keepers transversely received in said valve housing for travel therein to project the outer extremities thereof under said cover; and
   a locking cylinder carried in said lock housing and including a pair of eccentrically located connecting lugs projecting axially therefrom for engaging said keepers and operative upon actuation of said locking cylinder to retract said keepers, whereby said cap may be assembled by inserting said vent and vacuum relief springs and poppets in said respective bores, said lock housing positioned on said valve housing with said vent spring stop and vacuum relief poppet projecting into said respective vent and pressure relief bores and said lugs engaging said keepers.

7. Apparatus according to claim 6 wherein:
   the upper portion of said valve housing is in the form of an upright cap formed on its bottom wall with a centrally located opening disposed for receipt of the axially lower extremity of said locking cylinder; and
   seal means surrounding said valve housing.

* * * * *

Disclaimer 3,915,335.—*Donald J. Shanklin*, Granada Hills; *George E. Robson*, Torrance, both of Calif. LOCKING GAS CAP. Patent dated Oct. 28, 1975. Disclaimer filed Mar. 29, 1989, by the assignee, Mr. Gasket Company.

Hereby enters this disclaimer to the entire term of said patent.
[ *Official Gazette January 30, 1990* ]